3,503,697
PROCESS FOR DYEING OR PRINTING FIBERS
FROM AROMATIC POLYESTERS
Visvanathan Ramanathan, Basel, Switzerland, assignor to
Ciba Limited, Basel, Switzerland, a company of Switzerland
No Drawing. Continuation-in-part of application Ser. No.
478,757, Aug. 10, 1965. This application Nov. 15, 1967,
Ser. No. 683,140
Int. Cl. C09b 1/22; D06p 3/54
U.S. Cl. 8—39                                        9 Claims

ABSTRACT OF THE DISCLOSURE

Cinnamoylaminoanthraquinones of the formula

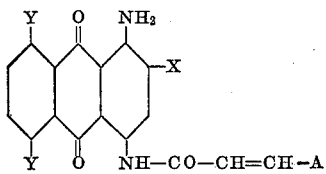

in which A is a phenyl radical, which may be substituted for example by halogen atom, lower alkyl, lower alkoxy or nitro groups X is a hydrogen or halogen atom, or a lower alkyl-, lower alkoxy-, phenoxy-, acyl-, nitro-, cyano-, lower alkyl-mercapto- or phenyl-mercapto-group, one Y is a hydrogen atom and the other Y is a hydrogen atom or a nitro-group yield valuable red to blue dyeings of high-fastness-properties on polyester fibers.

This is a continuation-in-part-application of our copending application Ser. No. 478,757, filed Aug. 10, 1965 now abandoned.

The present invention comprises a process for dyeing or printing fibers from aromatic polyester, especially polyethylene terephthalate with a cinnamoylaminoanthraquinone of the formula

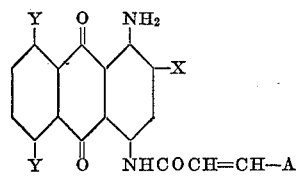

in which A is a phenyl radical, which may be substituted for example by halogen atoms, lower alkyl, lower alkoxy or nitro groups X is a hydrogen or halogen atom, or a lower alkyl-, lower alkoxy-, phenoxy-, acyl-, nitro-, cyano-, lower alkyl-mercapto- or phenyl-mercapto-group, one Y is a hydrogen atom and the other Y is a hydrogen atom or a nitro-group.

The present invention comprises also aromatic polyester fibers dyed or printed with a cinnamoylaminoanthraquinone as defined herein.

The dyestuffs may be obtained by acylating a 1:4-diaminoanthraquinone of formula

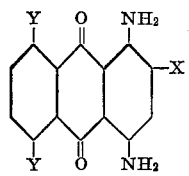

in which X and Y have the significance indicated, with a halide of a cinnamic acid. As examples of 1:4 diaminoanthraquinones are mentioned: 1:4-diaminoanthraquinone, 1:4-diamino-2-chloro-anthraquinone, 1:4-diamino-2-bromoanthraquinone, 1:4 - diamino-2-methoxyanthraquinone, 1:4-diamino-2-phenoxy-anthraquinone, 1:4-diamino-2-nitroanthraquinone, 1:4 - diamino-2-methylanthraquinone, 1:4-diamino-2-acetylanthraquinone, 1:4-diamino-2-benzoylanthraquinone, 1:4-diamino-2-cyanoanthraquinone, 1:4-diamino - 2 - methylmercaptoanthraquinone, 1:4-diamino-2-phenyl/mercaptoanthraquinone, 1:4-diamino-5-nitroanthraquinone and 1:4-diamino - 2 - diamino-2-bromo-5- or -8-nitroanthraquinone.

The acylating reagents used are preferably the halides, and particularly the chlorides, of cinnamic acids of the formula.

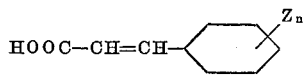

in which Z is a hydrogen or halogen atom, or a lower alkyl-, lower alkoxy- or nitro-group, and n is an integer having a value of 1 to 3. The following carboxylic acids may be quoted as examples: Cinnamic acid, 2-chlorocinnamic acid, 4-chlorocinnamic acid, 2-bromocinnamic acid, 4-bromocinnamic acid, 2:4-dichlorocinnamic acid, 3:4-dichlorocinnamic acid, 4-methylcinnamic acid, 3:4-dimethylcinnamic acid, 4-isopropylcinnamic acid, 2-trifluoromethylcinnamic acid, 2-methoxycinnamic acid, 4-methoxycinnamic acid, 3:4-dimethoxycinnamic acid and 3-nitrocinnamic acid.

Preferably about 1 mol of the acylating agent is used per mol of 1:4-diaminoanthraquinone. The acylation can be carried out by known methods, for example in an inert organic solvent such as nitrobenzene or chlorobenzene, dimethylformamide or N-methylpyrrolidone, if desired with the addition of an acid-binding agent, e.g. pyridine.

The cinnamoylaminoanthraquinones of the invention have proved particularly interesting when used for dyeing in admixture with the corresponding benzoylaminoanthraquinones: substantially more intense colors are obtained than with the pure benzoylaminoanthraquinone. For 1 mol of cinnamoylaminoanthraquinone it is advantageous to use one-third to 3 mols, preferably approximately 1 mol, of the appropriate benzoylaminoanthraquinone. As compared with the 1-hydroxy-4-cinnamoylaminoanthraquinone whose use for dyeing polyester fibers is described in Example 1 of British Patent No. 765,923, and, which gives blotchy dyeings on polyester fibers, the dyestuffs of the invention are distinguished by their ability to dye polyester fibers uniformly.

In Patent No. 2,155,673 to Miller the 1-amino-2-nitro-4-cinnamoyl-aminoanthraquinone is disclosed as intermediate for vat dyes but there is no hint in the patent to the use of 1-amino-2-nitro-4-cinnamoylanthraquinone as disperse dye.

For dyeing purposes the new dyestuffs are preferably used in finely divided form, dyeing being carried out with the addition of dispersing agent such as soap, sulfite cellulose waste lye or synthetic detergents, or a combination of different wetting and dispersing agents. It is generally advantageous to convert the dyestuff before dyeing into a dyestuff preparation which contains a dispersing agent together with the finely divided dyestuff in a form such that a fine dispersion is produced on diluting the dyestuff preparation with water. Such dyestuff preparations can be obtained in known manner e.g. by reprecipitation of the dyestuff from sulfuric acid and grinding of the sludge so obtained with sulfite waste lye, and if necessary by grinding the dyestuff in high efficiency grinding equipment, in a dry or wet form, with or without the addition of dispersing agent in the grinding process.

To obtain stronger dyeings on polyethylene terephthalate fibers it is generally advantageous to add a swelling agent to the dyebath or, especially, to carry out the dyeing process under superatmospheric pressure at a temperature above 100° C., for example, at 120° C. Suitable swelling agents are aromatic carboxylic acid acids, for example, benzoic acid or salicylic acid; phenols, for example, ortho- or para-hydroxydiphenyl; aromatic halogen compounds, for example, chlorobenzene, orthodichlorobenzene or trichlorobenzene; phenylmethylcarbinol or diphenyl. When dyeing under superatmospheric pressure it is advantageous to render the dyebath slightly acid, for example, by the addition of a weak acid, for example, acetic acid.

Owing to their fastness to alkalis the new dyestuffs are particularly suited for dyeing by the so-called thermofixing process, in which the material to be dyed is impregnated with an aqueous dispersion of the dyestuff, preferably containing 1 to 50% of urea and a thickening agent, particularly sodium alignate, preferably at temperatures of not more than 60° C., and squeezed in the usual manner. Preferably the impregnated goods are squeezed so as to retain an amount of dyeing liquid equivalent to 50 to 100% of their initial weight.

In order to fix the dyestuff the material impregnated in this manner is heated, e.g. in a current of warm air, to temperatures of above 100° C., for example between 180 to 220° C., preferably after preliminary drying.

The thermofixing process just described is of particular interest in the dyeing of mixed fabrics of polyester fibers and cellulose fibers, particularly cotton. In that case the padding liquid contains, in addition to the dyestuffs of the invention, dyestuffs suitable for the dyeing of cotton, particularly vat dyestuffs or reactive dyestuffs, i.e. dyestuffs which can be fixed to the cellulose fiber with the formation of a chemical bond, for example dyestuffs containing a chlorotriazine or chlorodiazine group. In the latter case it has proved advantageous to add an acid binding agent, for example an alkali carbonate, alkali phosphate, alkali borate or alkali perboate, or mixtures of these, to the padding solution. When vat dyestuffs are used it is necessary to treat the pad-dyed fabric, after the heat treatment, with an aqueous alkaline solution of a reducing agent to the type used in vat dyeing.

The dyeings obtained are preferably after-treated, for example by heating with an aqueous solution of a non-ionic detergent.

The dyestuffs may also be applied by printing intsead of impregnation. For this purpose for example a printing paste is used which in addition to the normal printing additives, such as wetting and thickening agents, contains the finely dispersed dyestuff, mixed if desired with one of the cotton dyestuffs mentioned above, optionally in the presence of urea and/or an acid-binding agent.

In the following examples the parts and percentages are by weight, unless otherwise stated.

EXAMPLE 1

1 part of 1-amino-2-methoxy-4-cinnamoylamino-anthraquinone is wet ground with 2 parts of a 50% aqueous solution of sulfite cellulose waste lye and dried.

This dyestuff preparation is stirred with 40 parts of a 10% aqueous solution of a condensation product of octadecyl alcohol and 20 mols ethylene oxide, and 4 parts of a 40% acetic acid solution are added. 4,000 parts of a dye bath are prepared from this by dilution with water.

100 parts of cleaned polyester fiber material is placed in this bath at 50° C., the temperature raised to 120–130° C., during half-an-hour and dyeing carried out for 1 hour at this temperature with the vessel closed. Thereafter the material is thoroughly rinsed. A red color of outstanding fastness to light and sublimation is obtained.

When a mixture consisting of equal parts of 1-amino-2-methoxy-4-cinnamoylaminoanthraquinone and 1-amino-2-methoxy-4-benzoylaminoanthraquinone is used, the polyester fibers are dyed in strong and even red shades of excellent fastness to light and sublimation.

EXAMPLE 2

200 parts of an aqueous dispersion containing 20 parts of 1-amino-2-nitro-4-cinnamoylaminoanthraquinone and 2 parts of sodium diisobutylnaphthalenesulfonate are poured into a solution of 50 parts of urea in 100 parts of water and the two thoroughly mixed by means of a high speed stirrer for a few minutes, with the simultaneous addition of 100 parts of a 20% sodium carbonate solution, 100 parts of a 5% sodium alginate solution and 450 parts of water.

A polyethylene terephthalate fabric is pad-dyed with the padding solution of obtained at 50 to 60° C. so that the impregnated material retains an amount of dyestuff solution corresponding to 65 to 70% of its initial weight; it is dried and subsequently heat-treated for 1 minute at 200 to 220° C.

Thereafter it is washed for 20 minutes at the boil with a solution containing 2 g./l. of a non-ionic detergent and 2 g./l. of anhydrous sodium carbonate, rinsed and dried. A blue dyeing of very good fastness is obtained.

EXAMPLE 3

In the following table in column I other dyestuffs are listed, which, when applied on polyester, fibers are described in the shades given in column II.

| Dyestuff: | Shade on polyester |
|---|---|
| (3) 1 - amino - 4 - cinnamoylaminoanthraquinone | Reddish violet. |
| (4) 1 - amino - 2 -bromo - 4 - cinnamoylaminoanthraquinone | Do. |
| (5) 1 - amino - 2 - methyl - 4 - cinnamoylaminoanthraquinone | Do. |
| (6) 1 - amino - 2 - nitro - 4 - cinnamoylaminoanthraquinone | Blue. |
| (7) 1 - amino - 2 -acetyl - 4 - cinnamoylaminoanthraquinone | |
| (8) 1 - amino - 2 -cyano - 4 - cinnamoylaminoanthraquinone | Reddish. |
| (9) 1 - amino - 2 - ethoxy - 4 - cinnamoylaminoanthraquinone | Red. |
| (10) 1 - amino - 2 - phenoxy - 4 - cinnamoylaminoanthraquinone | Do. |
| (11) 1 - amino - 2 - methylmercapto - 4 - cinnamoylaminoanthraquinone | Bluish red. |
| (12) 1 - amino - 2 - phenylmercapto - 4 - cinnamoylaminoanthraquinone | Do. |
| (13) 1 - amino - 5 - nitro - 4 - cinnamoylaminoanthraquinone | Violet. |
| (14) 1 - amino - 2 - bromo - 5 - nitro - 4 - cinnamoylaminoanthraquinone | Do. |
| (15) 1 - amino - 4(m-nitrocinnamoylamino)-anthraquinone | Reddish violet |
| (16) 1 - amino - 4 - (p-methylcinnamoylamino)-anthraquinone | Do. |
| (17) 1 - amino - 4 - (p-methoxycinnamoylamino)-anthraquinone | Do. |
| (18) 1 - amino - 4 - (o-chlorocinnamoylamino)-anthraquinone | Do. |
| (19) 1 - amino - 2 - bromo-4-(p-methylcinnamoylamino) - anthraquinone. | |
| (20) 1 - amino - 2 - bromo-4-(o-chlorocinnamoylamino) - anthraquinone | Do. |
| (21) 1 - amino - 2 - chloro-4-cinnamoylaminoanthraquinone | Do. |

What is claimed is:
1. A process for dyeing or printing linear polyester fibers comprising contracting said fibers with a cinnamoylaminoanthraquinone of the formula

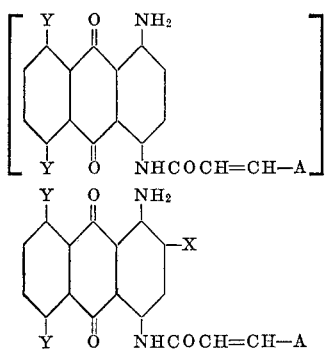

in which A is a phenyl radical, or a phenyl radical substituted by halogen atoms, lower alkyl, lower alkoxy or nitro groups, X is a hydrogen or halogen atom, or a lower alkyl-, lower alkoxy-, phenoxy-, acyl-, nitro-, cyano-, lower alkylmercapto- or phenylmercapto-group, one Y is a hydrogen atom and the other Y is a hydrogen atom or a nitro-group is used.

2. A process as claimed in claim 1, in which a cinnamoylaminoanthraquinone of the given formula is used in which A is the radical of the formula

in which Z is hydrogen or halogen a lower alkyl, lower alkoxy or nitro group and $n$ is an integer from 1 to 3.

3. Aromatic polyester fibers dyed or printed with a dyestuff of the formula

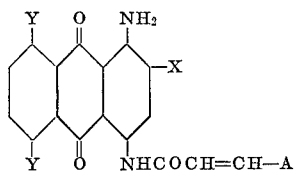

in which A is a benzene radical, X is a hydrogen or halogen atom, a lower alkyl-, lower alkoxy-, phenoxy-, acyl-, nitrocyano-, lower alkylmercapto- or phenylmercapto-group, one Y is a hydrogen atom and the other Y a hydrogen atom or a nitro-group.

4. Aromatic polyester fibers dyed or printed with a dyestuff as claimed in claim 3 which A is the radical of the formula

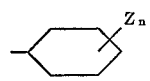

in which Z is hydrogen or halogen, a lower alkyl, lower alkoxy or nitro group and $n$ is an integer from 1 to 3 inclusively 5. Aromatic polyester fibers dyed or printed with a dyestuff as claimed in claim 3 of the formula

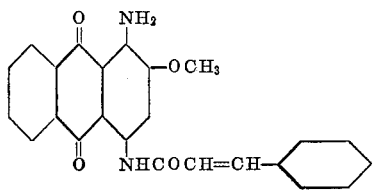

6. Aromatic polyester fibers dyed or printed with a dyestuff as claimed in claim 3 of the formula

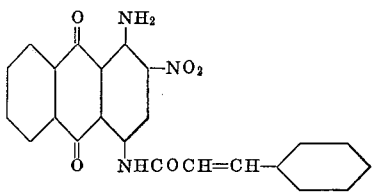

7. Aromatic polyester fibers dyed or printed with a dyestuff as claimed in claim 3 of the formula

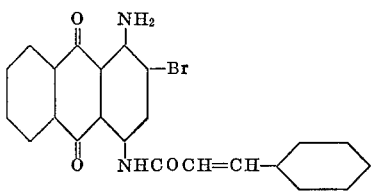

8. Aromatic polyester fibers dyed or printed with a dyestuff as claimed in claim 3 of the formula

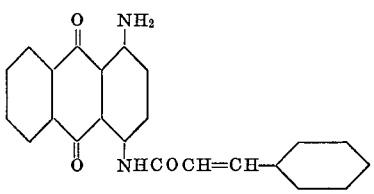

9. Aromatic polyester fibers dyed or printed with a dyestuff as claimed in claim 3 of the formula

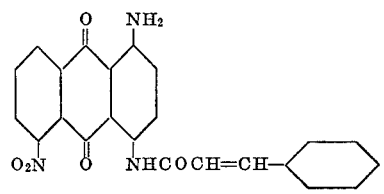

References Cited

UNITED STATES PATENTS

| | | | |
|---|---|---|---|
| 2,155,673 | 4/1939 | Miller | 260—377 |
| 2,226,909 | 12/1940 | Peter | 260—373 XR |
| 2,918,344 | 12/1959 | Jenny | 8—39 |
| 2,937,190 | 5/1960 | Straley et al. | 260—377 XR |
| 3,086,977 | 4/1963 | Turetzky | 260—384 XR |

FOREIGN PATENTS

| | | |
|---|---|---|
| 628,512 | 5/1963 | Belgium. |
| 765,923 | 1/1957 | Great Britain. |
| 418,937 | 12/1910 | France. |
| 806,284 | 12/1936 | France. |

DONALD LEVY, Primary Examiner

B. BETTIS, Assistant Examiner

U.S. Cl. X.R.

8—55

PO-1050
(5/69)

CASE 5521/E/CIP

UNITED STATES PATENT OFFICE
CERTIFICATE OF CORRECTION

Patent No. 3,503,697  Dated March 31, 1970

Inventor(s) VISVANATHAN RAMANATHAN

It is certified that error appears in the above-identified patent and that said Letters Patent are hereby corrected as shown below:

Column 5, lines 3-9, delete the bracketed formula.

SIGNED AND SEALED
MAR 2 1971

(SEAL)
Attest:

Edward M. Fletcher, Jr.
Attesting Officer

WILLIAM E. SCHUYLER, JR.
Commissioner of Patents